US009650030B2

United States Patent
Nagura (10) Patent No.: US 9,650,030 B2
(45) Date of Patent: May 16, 2017

(54) TRAILER COUPLING DETERMINATION APPARATUS AND TRAILER COUPLING DETERMINATION METHOD

(71) Applicant: VOLVO TRUCK CORPORATION, Goeteborg (SE)

(72) Inventor: Katsuhiro Nagura, Ageo (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 89 days.

(21) Appl. No.: 14/705,918

(22) Filed: May 6, 2015

(65) Prior Publication Data

US 2015/0232078 A1    Aug. 20, 2015

Related U.S. Application Data

(63) Continuation of application No. PCT/JP2012/078808, filed on Nov. 7, 2012.

(51) Int. Cl.
| | | |
|---|---|---|
| *B60T 17/22* | (2006.01) | |
| *G01M 3/28* | (2006.01) | |
| *B60T 17/18* | (2006.01) | |
| *B60T 13/26* | (2006.01) | |

(52) U.S. Cl.
CPC ............ *B60T 17/22* (2013.01); *B60T 17/221* (2013.01); *G01M 3/2815* (2013.01); *B60G 2400/97* (2013.01); *B60T 13/263* (2013.01); *B60T 17/18* (2013.01)

(58) Field of Classification Search
None
See application file for complete search history.

(56) References Cited

U.S. PATENT DOCUMENTS 5,069,472 A * 12/1991 Parr ....................... B62D 53/12
                                                       280/432
5,986,544 A    11/1999 Kaisers et al.
(Continued)

FOREIGN PATENT DOCUMENTS

CN    1406803 A    4/2003
DE    19744066 A1    4/1999
(Continued)

OTHER PUBLICATIONS

Extended European Search Report dated Mar. 31, 2016, which issued in European Application No. 12888160.4.
(Continued)

*Primary Examiner* — Fadey Jabr
*Assistant Examiner* — Kevin P Mahne
(74) *Attorney, Agent, or Firm* — McDermott Will & Emery LLP (57) ABSTRACT

When a brake of a tractor is released, a control unit having a computer built therein monitors the pressure of working fluid output from a trailer control valve that controls a brake of the trailer in conjunction with the brake of the tractor. When time required for a pressure of the working fluid to decrease to a predetermined pressure is a predetermined time or longer, the control unit determines that the trailer is coupled with the tractor. When the time is less than the predetermined time, the control unit determines that the trailer is not coupled with the tractor.

12 Claims, 5 Drawing Sheets

(56) References Cited

U.S. PATENT DOCUMENTS

| | | | |
|---|---|---|---|
| 2008/0309154 A1* | 12/2008 | Hilberer | B60T 7/085 303/15 |
| 2010/0085172 A1* | 4/2010 | Ancuta | B60T 17/22 340/431 |
| 2010/0106385 A1* | 4/2010 | Ramler | B60T 13/265 701/70 |
| 2011/0147142 A1 | 6/2011 | Standen | |
| 2012/0025487 A1 | 2/2012 | Kneer et al. | |

FOREIGN PATENT DOCUMENTS

| | | |
|---|---|---|
| EP | 0469696 A1 | 2/1992 |
| EP | 2415648 A2 | 2/2012 |
| JP | 09-136634 A | 5/1997 |
| JP | 10-236299 A | 9/1998 |
| JP | 11-165623 A | 6/1999 |
| JP | 11-278317 A | 10/1999 |
| JP | 2010-137689 A | 6/2010 |
| WO | WO-2008/085184 A2 | 7/2008 |

OTHER PUBLICATIONS

International Preliminary Report on Patentability dated May 21, 2015, which issued in International Application No. PCT/JP2012/078808, and English language translation thereof.

Chinese Office Action dated Sep. 1, 2016, which issued in Chinese Application No. 201280076838.8, together with an English language translation thereof.

* cited by examiner

TRAILER COUPLING DETERMINATION APPARATUS AND TRAILER COUPLING DETERMINATION METHOD

CROSS-REFERENCE TO RELATED APPLICATION

This application is a continuation application of PCT/JP2012/078808, filed on Nov. 7, 2012.

BACKGROUND OF THE INVENTION

1. Field of the Invention

The present invention relates to a trailer coupling determination apparatus and to a trailer coupling determination method for determining whether or not a trailer is coupled with a tractor.

2. Description of Related Art

Since the gross weight of a tractor for towing a trailer greatly changes depending on whether or not the trailer is coupled, the ways in which the engine, the transmission, the brake or the like are controlled may be changed accordingly, for example. Thus, as disclosed in Japanese Patent Application Laid-open Publication No. H11(1999)-165623, a technique for determining whether or not a trailer is coupled with a tractor is proposed, which is based on a characteristic of increasing in control pressure for controlling a service brake (regular brake) of the trailer.

Conventional techniques, however, determine whether a trailer is coupled or not based on the characteristic of increasing in control pressure for controlling a service brake of the trailer, and so the determination for trailer coupling cannot be made before the actual start of tractor travel. If the engine or the like were controlled at the start of tractor travel while towing a trailer as if the trailer were not coupled, the tractor may not start smoothly due to insufficient driving power, for example.

SUMMARY OF THE INVENTION

Thus, the present invention aims to provide a trailer coupling determination apparatus and a trailer coupling determination method, which are capable of determining whether a trailer is coupled or not before the start of tractor travel.

To this end, the present invention is configured so that a control unit including a computer built therein determines whether or not a trailer is coupled with a tractor when the brake of the tractor is released, based on a characteristic of decreasing in pressure of working fluid output from a trailer control valve that controls a brake of the trailer in conjunction with the brake of the tractor.

According to one aspect of the present invention, a determination can be made, before a tractor starts traveling, as to whether or not a trailer is coupled with the tractor.

DESCRIPTION OF PREFERRED EMBODIMENTS

The following describes embodiments for carrying out the present invention, with reference to the accompanying drawings.

Figure 1:
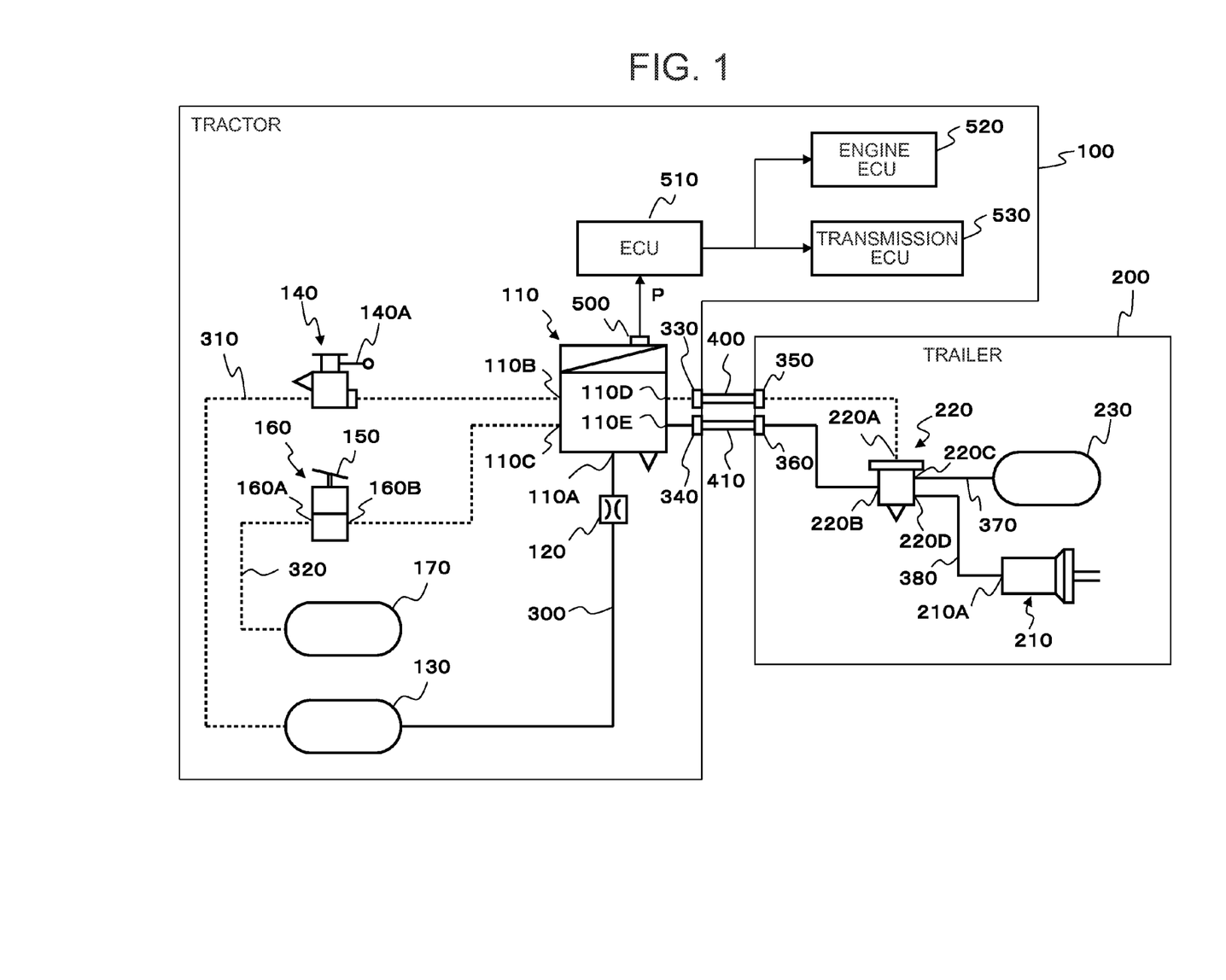
FIG. 1 illustrates an exemplary brake system that controls a brake of a trailer.

FIG. 1 illustrates an exemplary brake system that operates with air as a working fluid of which the pressure is increased to atmospheric pressure or greater, to control a brake of a trailer.

At a predetermined position of a tractor 100, a trailer control valve 110 is attached, which operates in conjunction with a brake of the tractor 100 to control a brake of a trailer 200.

The trailer control valve 110 includes an input port 110A to which working fluid is input, and a first control port 110B and a second control port 110C to which working fluid (control pressure) for controlling a service brake of the trailer 200 is input.

The input port 110A is communicatively connected to an air reservoir 130 that stores the working fluid, via a pipe 300 in which a pressure regulation valve 120 for regulating the working fluid at a specified pressure is provided. This allows the working fluid stored in the air reservoir 130 to be supplied to the input port 110A while being regulated at the specified pressure by the pressure regulation valve 120.

Figure 2:
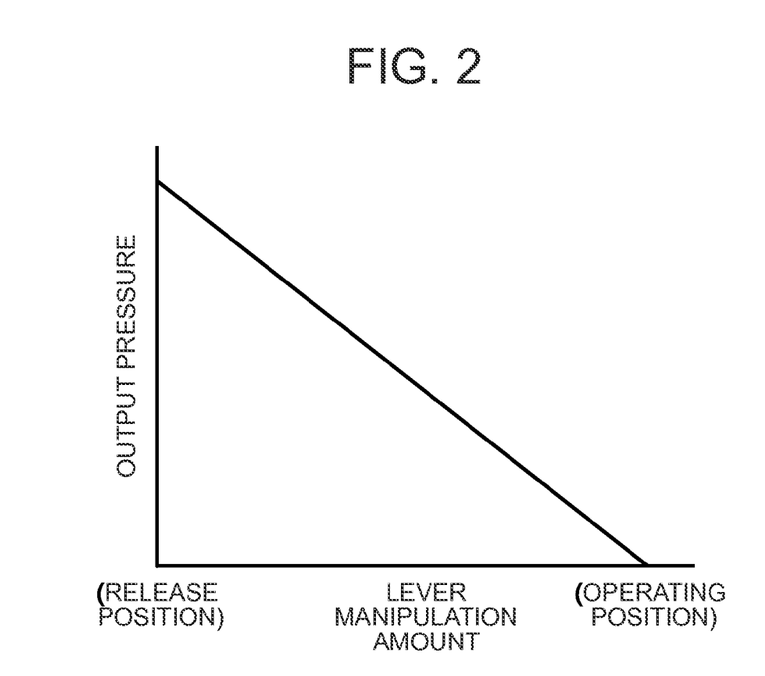
FIG. 2 describes input/output characteristics of a hand control valve.

The first control port 110B is communicatively connected to the air reservoir 130 via a pipe 310 in which a hand control valve 140 for manipulating a service brake of the trailer 200 is provided. As illustrated in FIG. 2, the hand control valve 140 has input and output characteristics such that, as the manipulation amount of a lever 140A increases, the pressure-decreasing ratio gradually increases, i.e., the output pressure gradually decreases. This means that, when the lever 140A of the hand control valve 140 is manipulated to the release position, then the working fluid stored in the air reservoir 130 is supplied to the first control port 110B of the trailer control valve 110, so that the control pressure of the service brake of the trailer 200 becomes 0 (atmospheric pressure). On the other hand, when the lever 140A of the hand control valve 140 is manipulated to the operating position, then supply of the working fluid stored in the air reservoir 130 is stopped, so that the control pressure of the service brake of the trailer 200 becomes the maximum. The reason making the control pressure input to the first control port 110B of the trailer control valve 110 to be 0 (zero) when the service brake of the trailer 200 is operated, is to prevent wasteful consumption of working fluid of the air reservoir 130 during parking for a long time, for example.

The second control port 110C is communicatively connected to an air reservoir 170 that stores working fluid, via a pipe 320 in which a brake valve 160 that operates in response to the manipulation of a brake pedal 150 is provided. The brake valve 160 has the input and output characteristics such that the working fluid supplied to an input port 160A is regulated to a pressure that is substantially proportional to the amount of manipulation of the brake pedal 150 and the regulated working fluid is output from an output port 160B. This allows the control pressure that is substantially proportional to the amount of manipulation of the brake pedal 150 to be supplied to the second control port 110C of the trailer control valve 110.

The trailer control valve 110 further includes a first output port 110D that outputs the control pressure for controlling the service brake of the trailer 200 and a second output port 110E that supplies (outputs) the working fluid to the trailer 200.

The first output port 110D is communicatively connected to a coupling 330. A jumper hose 400 for control pressure is detachably connected to the coupling 330. The second output port 110E is communicatively connected to a coupling 340. A jumper hose 410 for working fluid is detachably connected to the coupling 340. These jumper hoses 400 and 410 each have a flexible hose part and coupling parts attached to both ends of the hose part.

Figure 3:
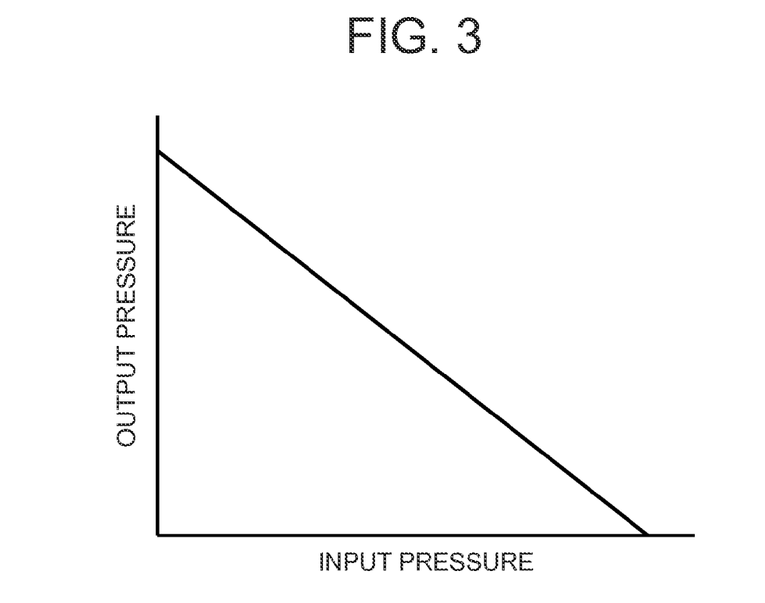
FIG. 3 describes input/output characteristics of a trailer control valve.

Then as illustrated in FIG. 3, the trailer control valve 110 has input and output characteristics such that, as the control pressure input to the first control port 110B increases, the control pressure output from the first output port 110D gradually decreases. The trailer control valve 110 further has the input and output characteristics such that, as the control pressure input to the second control port 110C increases, the control pressure output from the first output port 110D gradually increases. That is, when the service brake of the trailer 200 is to be operated, the trailer control valve 110 outputs the control pressure from the first output port 110D.

At predetermined positions of the trailer 200, a brake chamber 210 that lets the brake operate, a relay valve 220 that controls the pressure of the working fluid to be supplied to the brake chamber 210, and an air reservoir 230 that stores working fluid, are provided.

The brake chamber 210 lets the brake attached to a wheel (not illustrated) operate with a braking force according to the pressure of the working fluid supplied to an input port 210A.

The relay valve 220 includes a control port 220A to which the control pressure for controlling the brake is input, a first input port 220B and a second input port 220C to which the working fluid is input, and an output port 220D that outputs the working fluid, the pressure of which has been regulated according to the control pressure input to the control port 220A. The relay valve 220 is equipped with a function of, when no working fluid is supplied from the air reservoir 230 to the brake chamber 210, supplying the working fluid which has been input to the first input port 220B, to the air reservoir 230 using a difference in pressure from the air reservoir 230.

The control port 220A is communicatively connected to a coupling 350. The jumper hose 400 for control pressure is detachably connected to the coupling 350. The first input port 220B is communicatively connected to a coupling 360. The jumper hose 410 for working fluid is detachably connected to the coupling 360. The second input port 220C is communicatively connected to the air reservoir 230 via a pipe 370. The output port 220D is communicatively connected to the brake chamber 210 via a pipe 380.

Therefore, when the tractor 100 and the trailer 200 are connected via the jumper hoses 400 and 410, the working fluid supplied from the tractor 100 is supplied to the air reservoir 230 via the relay valve 220 of the trailer 200. This allows the trailer 200 to keep its own working fluid to allow the brake to operate, and so allows, for example, the brake to operate without depending on the working fluid stored in the air reservoir 130 of the tractor 100.

Next, the following describes the action of the brake system.

In the tractor 100, when the lever 140A of the hand control valve 140 is manipulated from the release position to the operating position in order to activate a parking brake, then the control pressure input to the first control port 110B of the trailer control valve 110 becomes 0, as illustrated in FIG. 2.

Since the trailer control valve 110 has the input and output characteristics as illustrated in FIG. 3, the control pressure, which has been regulated to be the specified pressure, is output from the first output port 110D. Since the control pressure at the specified pressure is input to the control port 220A of the relay valve 220 at the trailer 200, then the working fluid stored in the air reservoir 230 is supplied to the brake chamber 210. This allows the service brake of the trailer 200 to operate.

On the other hand, in the tractor 100, when the lever 140A of the hand control valve 140 is manipulated from the operating position to the release position in order to release the parking brake, then the control pressure input to the first control port 110B of the trailer control valve 110 becomes the maximum, as illustrated in FIG. 2. Since the trailer control valve 110 has the input and output characteristics as illustrated in FIG. 3, the control pressure output from the first output port 110D becomes 0. Since the control pressure input to the control port 220A of the relay valve 220 becomes 0 at the trailer 200, then supply of the working fluid from the air reservoir 230 to the brake chamber 210 is stopped, and the working fluid is discharged from the brake chamber 210. This allows the service brake of the trailer 200 to be released.

In the tractor 100, when the brake pedal 150 is pressed down to activate the service brake, then the control pressure according to the amount of the manipulation of the brake pedal 150 is input to the second control port 110C of the trailer control valve 110. Then, the control pressure according to the amount of the manipulation of the brake pedal 150 is supplied to the trailer 200, and so the working fluid is supplied to the brake chamber 210 and the service brake operates.

In the tractor 100, when the pressing-down of the brake pedal 150 is released in order to release the service brake, then the control pressure supplied to the trailer 200 becomes 0, and so the working fluid is discharged from the brake chamber 210, and the service brake is released.

The tractor 100 is provided with a coupling determination apparatus that determines whether or not the trailer 200 is coupled with the tractor 100.

The coupling determination apparatus includes: a sensor 500 that measures a pressure of the working fluid output from the trailer control valve 110 in conjunction with the brake of the tractor 100, i.e., a control pressure P output from the first output port 110D; and a control unit 510 that includes a computer built therein. Thus, the control unit 510 determines, when the brake of the tractor 100 is released, whether the trailer 200 is coupled with the tractor 100 or not based on the characteristic of decreasing in control pressure P measured by the sensor 500.

Figure 4:
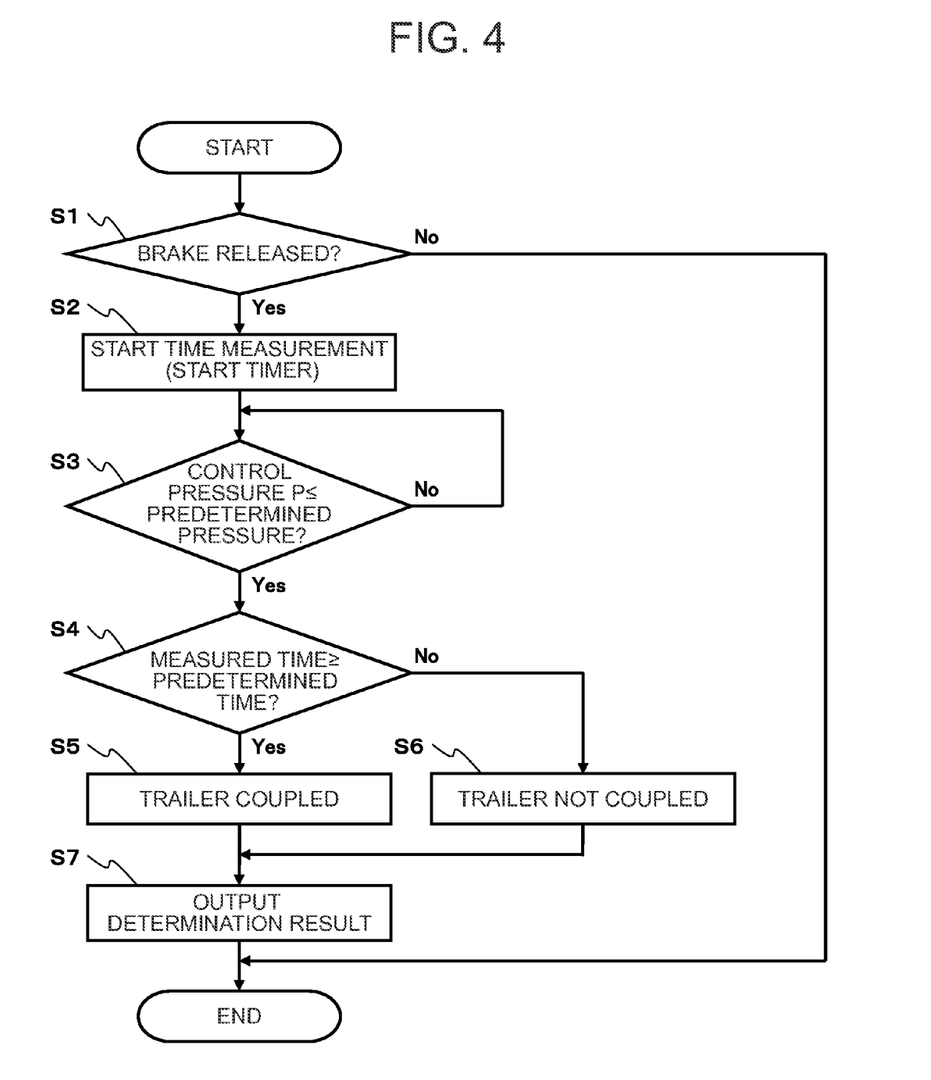
FIG. 4 is a flowchart illustrating an exemplary control program.

FIG. 4 illustrates an exemplary control program that is executed repeatedly by the control unit 510, which is triggered by the activation of the control unit 510.

At Step 1 (abbreviated as "S1" in the drawing, the same applies hereinafter), the control unit 510 determines whether or not the brake of the tractor 100 is released. As used herein, releasing of the brake of the tractor 100 means that, when both of the parking brake and the service brake operate, both of the brakes are released, and when only one of the parking brake and the service brake operates, the brake in operation is released. The determination as to whether or not the parking brake is released can be made based on the output of a switch that detects whether the lever 140A of the hand control valve 140 is at the operating position or not, or the output of a sensor that measures the control pressure input to the first control port 110B of the trailer control valve 110, for example. The determination as to whether or not the service brake is released can be made based on the output of the brake switch attached to the brake pedal 150 or the illumination state of a stop lamp, for example. Then, when it is determined that the brake is released, then the control unit 510 advances the procedure to Step 2 (Yes). On the other hand, when it is determined that the brake is not released, the procedure ends (No).

At Step 2, in order to measure the elapsed time since the release of the brake, the control unit 510 starts a timer, to start the measurement of time.

At Step 3, the control unit 510 reads the control pressure P from the sensor 500, and determines whether the control pressure P decreases to a predetermined pressure or not based on the determination as to whether the control pressure P is the predetermined pressure or less. Herein, the predetermined pressure is a threshold for determining whether or not the working fluid is discharged from the downstream of the trailer control valve 110, which may be a pressure (pressure that is impossible at altitudes at which a vehicle typically travels) slightly greater than the standard atmospheric pressure. Then, when it is determined that the control pressure P decreases to the predetermined pressure, then the control unit 510 advances the procedure to Step 4 (Yes). On the other hand, when it is determined that the control pressure P does not decrease to the predetermined pressure, the processing at Step 3 is repeated (No).

At Step 4, the control unit 510 determines whether the time measured by the timer reaches a predetermined time or longer. Herein, the predetermined time is a threshold for determining whether the trailer 200 is coupled with the tractor 100 or not, which may be appropriately set according to the volume of a pipe positioned downstream of the first output port 110D of the trailer control valve 110 and the volume of the jumper hose 400, for example. Then, when it is determined that the measured time is the predetermined time or longer, the control unit 510 advances the procedure to Step 5 (Yes). On the other hand, when the measured time is less than the predetermined time, the control unit 510 advances the procedure to Step 6 (No).

At Step 5, the control unit 510 determines that the trailer 200 is coupled with the tractor 100.

At Step 6, the control unit 510 determines that the trailer 200 is not coupled with the tractor 100.

At Step 7, the control unit 510 outputs a determination result as to whether the trailer 200 is coupled with the tractor 100 to another control unit that is connected via a vehicle-mounted network such as a controller area network (CAN). Herein, such another control unit may include an engine control unit 520 that electronically controls the engine, a transmission control unit 530 that electronically controls the transmission, and the like, as illustrated in FIG. 1.

Such a coupling determination apparatus measures, when the brake of the tractor 100 is released, time for the control pressure output from the trailer control valve 110 to decrease to the predetermined pressure (characteristic of decreasing). When the measured time is a predetermined time or longer, it is determined that the trailer 200 is coupled with the tractor 100, and when the measured time is less than the predetermined time, it is determined that the trailer 200 is not coupled with the tractor 100. Then, this determination result is output to another control unit, such as the engine control unit 520 or the transmission control unit 530.

Figure 5:
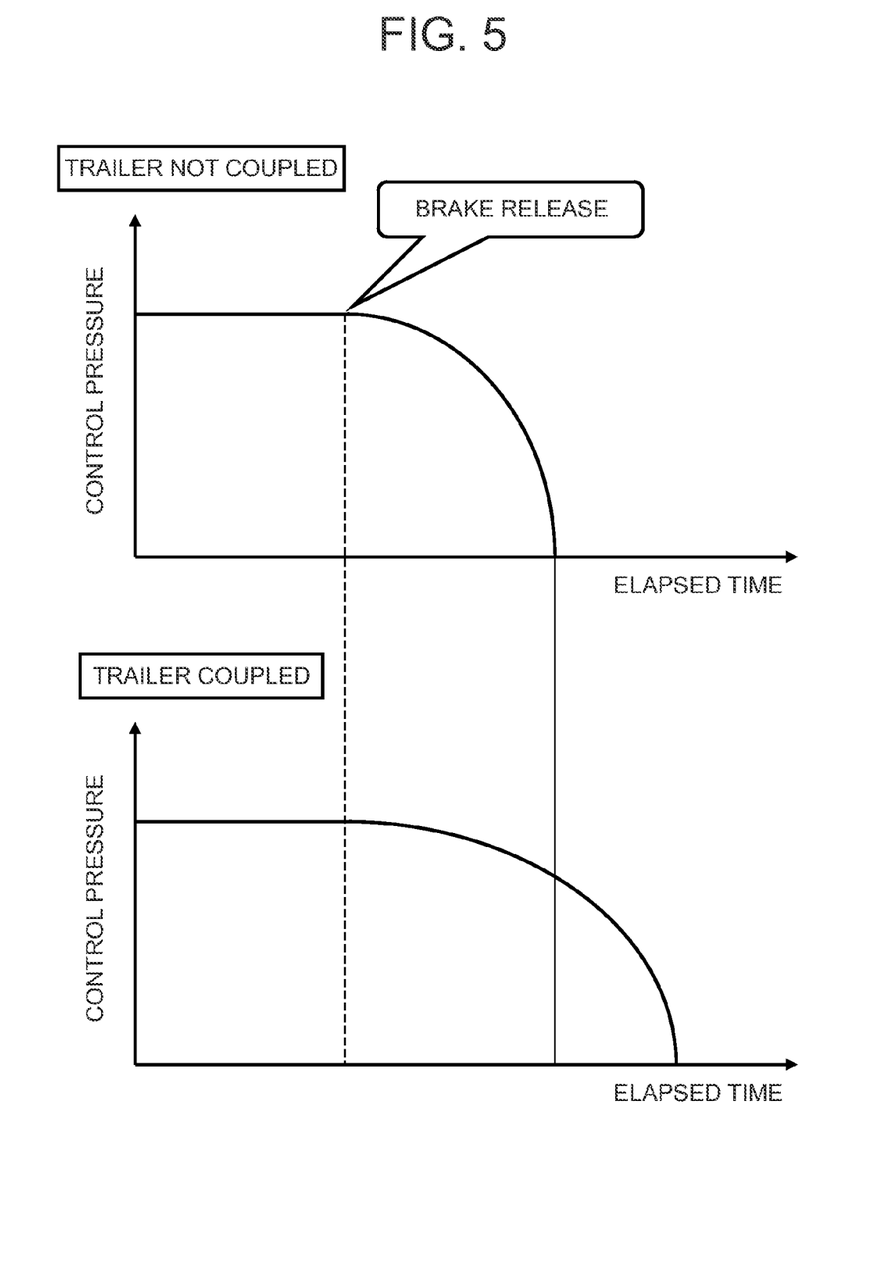
FIG. 5 describes a method for determining the coupling state of a trailer.

When the trailer 200 is coupled with the tractor 100, more working fluid is present than in the case of the trailer 200 not being coupled with the tractor 100, because the jumper hose 400, the pipe, and the like are arranged downstream of the first output port 110D of the trailer control valve 110. Then, as illustrated in FIG. 5, when the trailer 200 is coupled with the tractor 100, a time required to decrease the pressure of the working fluid to the predetermined pressure after the brake release becomes longer than in the case of the trailer 200 not being coupled with the tractor 100. In this way, determination can be made as to whether the trailer 200 is coupled with the tractor 100 or not before the tractor 100 starts traveling, based on the characteristic of decreasing in pressure of the working fluid output from the first output port 110D of the trailer control valve 110.

Figure 6:
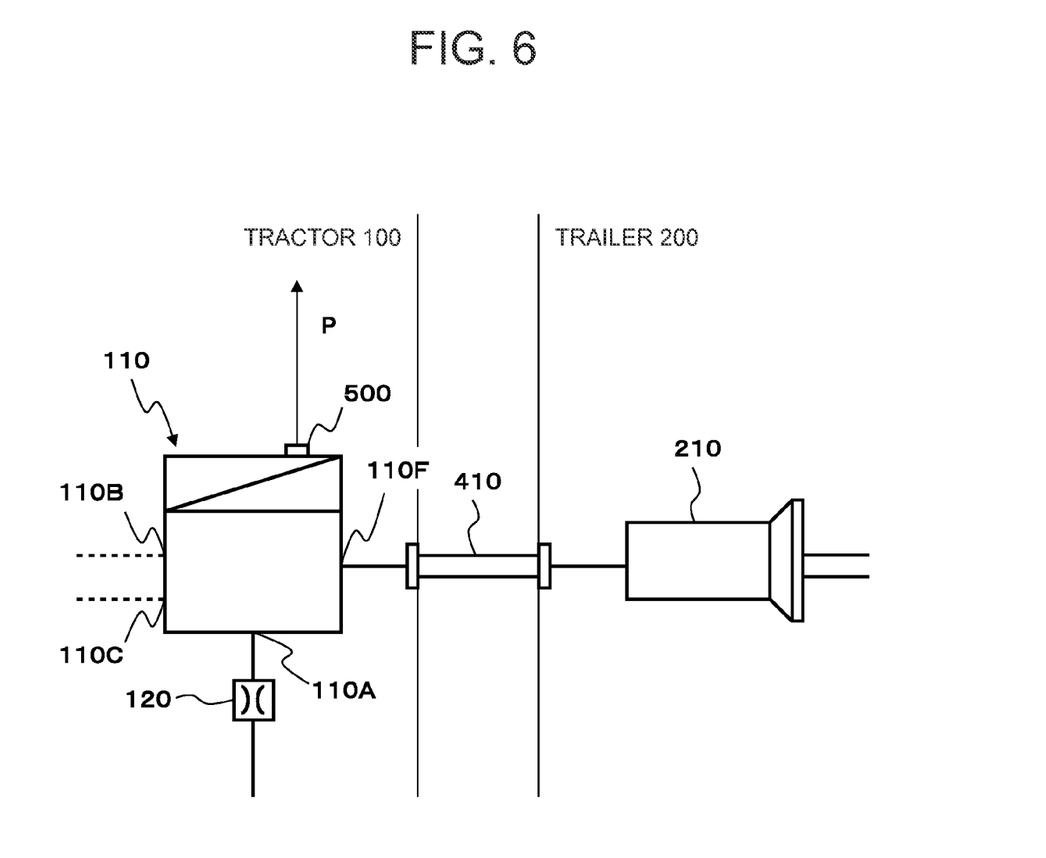
FIG. 6 describes another exemplary brake system that controls a brake of a trailer.

As illustrated in FIG. 6, the brake system may be configured so that working fluid for activating the brake chamber 210 is directly supplied from the tractor 100 to the trailer 200. In this case, the trailer control valve 110 of the tractor 100 decreases the pressure of the working fluid supplied from the air reservoir 130 according to the control pressure input to the first control port 110B or the second control port 110C, and outputs the working fluid from an output port 110F. Meanwhile, since the trailer 200 is not required to control the brake chamber 210 and to keep the working fluid, the relay valve 220 and the air reservoir 230 can be omitted. Then, in the brake system illustrated in FIG. 6, the sensor 500 may measure the pressure P of the working fluid downstream of the output port 110F as the pressure of the working fluid output from the trailer control valve 110.

Furthermore, when the operation to couple or decouple the trailer 200 with respect to the tractor 100 may be performed, determination has to be made as to whether or not the trailer 200 is coupled with the tractor 100. Since such coupling or decoupling operation of the trailer 200 is always performed to the tractor 100 in the parking state, the determination of whether or not the trailer 200 is coupled with the tractor 100 may be made when the parking brake of the tractor 100 is released.

It should also be understood that many modifications and variations of the described embodiments of the invention will be apparent to a person having an ordinary skill in the art without departing from the spirit and scope of the present invention as claimed in the appended claims. Furthermore, the foregoing description of the embodiment according to the present invention is provided for illustration only, and it is not for the purpose of limiting the invention, the invention as claimed in the appended claims and their equivalents.

What is claimed is:

1. A trailer coupling determination apparatus comprising:
a sensor for measuring a pressure of working fluid output from a trailer control valve that controls a brake of a trailer in conjunction with a brake of a tractor; and
a control unit that includes a computer built therein,
wherein the control unit is configured to determine whether or not the trailer is coupled with the tractor when the brake of the tractor is released, based on a characteristic of decreasing in pressure of the working fluid measured by the sensor, and
wherein the characteristic of decreasing is time required for pressure of the working fluid to decrease to a predetermined pressure.

2. The trailer coupling determination apparatus according to claim 1, wherein the control unit is configured to determine that the trailer is coupled with the tractor when the time is a predetermined time or longer, whereas the control unit is configured to determine that the trailer is not coupled with the tractor when the time is less than the predetermined time.

3. The trailer coupling determination apparatus according to claim 1, wherein the brake of the tractor is a parking brake, and the brake of the trailer is a service brake.

4. The trailer coupling determination apparatus according to claim 1, wherein the pressure of the working fluid is a control pressure for controlling the brake of the trailer.

5. The trailer coupling determination apparatus according to claim 1, wherein the working fluid is air, a pressure of which is increased to atmospheric pressure or greater.

6. The trailer coupling determination apparatus according to claim 1, wherein the control unit is configured to output a determination result as to whether or not the trailer is coupled to another control unit mounted on the tractor.

7. A trailer coupling determination method comprising the step of:
 providing a control unit;
 receiving a characteristic of a working fluid output from a trailer control valve that controls a brake of a trailer in conjunction with a brake of a tractor;
 determining, by the control unit that includes a computer built therein, whether or not the trailer is coupled with the tractor when the brake of the tractor is released, based on the characteristic of the working fluid, wherein the characteristic of the working fluid is a time required for pressure of the working fluid to decrease to a predetermined pressure; and
 outputting a determination result to an engine control unit or a transmission control unit.

8. The trailer coupling determination method according to claim 7, wherein the control unit determines that the trailer is coupled with the tractor when the time is a predetermined time or longer, whereas the control unit determines that the trailer is not coupled with the tractor when the time is less than the predetermined time.

9. The trailer coupling determination method according to claim 7, wherein the brake of the tractor is a parking brake, and the brake of the trailer is a service brake.

10. The trailer coupling determination method according to claim 7, wherein the pressure of the working fluid is a control pressure for controlling the brake of the trailer.

11. The trailer coupling determination method according to claim 7, wherein the working fluid is air, a pressure of which is increased to atmospheric pressure or greater.

12. The trailer coupling determination method according to claim 7, wherein the control unit outputs a determination result as to whether or not the trailer is coupled to another control unit mounted on the tractor.

* * * * *